(12) United States Patent
Ben-Arie

(10) Patent No.: US 7,366,645 B2
(45) Date of Patent: Apr. 29, 2008

(54) METHOD OF RECOGNITION OF HUMAN MOTION, VECTOR SEQUENCES AND SPEECH

(75) Inventor: Jezekiel Ben-Arie, ECE Dept. MC154, 851 S. Morgan St., University of Illinois at Chicago, SEO1020, Chicago, IL (US) 60607

(73) Assignee: Jezekiel Ben-Arie, Chicago, IL (US)

( * ) Notice: Subject to any disclaimer, the term of this patent is extended or adjusted under 35 U.S.C. 154(b) by 647 days.

(21) Appl. No.: 10/427,882

(22) Filed: May 1, 2003

(65) Prior Publication Data

US 2003/0208289 A1 Nov. 6, 2003

Related U.S. Application Data

(60) Provisional application No. 60/378,316, filed on May 6, 2002, provisional application No. 60/381,002, filed on May 15, 2002.

(51) Int. Cl.
*G06G 7/48* (2006.01)
(52) U.S. Cl. .................. 703/6; 703/2; 703/11
(58) Field of Classification Search ............ 703/6, 703/11, 2; 706/246
See application file for complete search history.

(56) References Cited

U.S. PATENT DOCUMENTS

| | | | |
|---|---|---|---|
| 5,386,492 A | 1/1995 | Wilson et al. | |
| 5,502,774 A | 3/1996 | Bellegarda et al. | |
| 5,577,249 A | 11/1996 | Califano | |
| 5,581,276 A | 12/1996 | Cipolla et al. | |
| 5,621,809 A | 4/1997 | Bellegarda et al. | |
| 5,714,698 A | 2/1998 | Tokioka et al. | |
| 6,222,465 B1 | 4/2001 | Kumar et al. | |
| 6,256,033 B1 | 7/2001 | Nguyen | |
| 6,269,172 B1* | 7/2001 | Rehg et al. | 382/103 |
| 6,292,779 B1 | 9/2001 | Wilson et al. | |
| 6,371,711 B1 | 4/2002 | Berger | |
| 6,542,869 B1 | 4/2003 | Foote | |
| 6,571,193 B1* | 5/2003 | Unuma et al. | 702/141 |
| 2002/0052742 A1 | 5/2002 | Thrasher et al. | |
| 2002/0062302 A1 | 5/2002 | Oosta | |
| 2002/0181711 A1 | 12/2002 | Logan et al. | |

OTHER PUBLICATIONS

Jezekiel Ben-Arie, Purvin Pandit, ShyamSundar Rajaram; "Design of A Digital Library for Human Movement"; 2001; ACM; JCDL'01, pp. 300-309.*

(Continued)

*Primary Examiner*—Paul Rodriguez
*Assistant Examiner*—Jason Proctor

(57) ABSTRACT

A method for recognition of an input human motion as being the most similar to one model human motion out of a collection of stored model human motions. In the preferred method, both the input and the model human motions are represented by vector sequences that are derived from samples of angular poses of body parts. The input and model motions are sampled at substantially different rates. A special optimization algorithm that employs sequencing constraints and dynamic programming, is used for finding the optimal input-model matching scores. When only partial body pose information is available, candidate matching vector pairs for the optimization are found by indexing into a set of hash tables, where each table pertains to a sub-set of body parts. The invention also includes methods for recognition of vector sequences and for speech recognition.

20 Claims, 8 Drawing Sheets

OTHER PUBLICATIONS

Ben-Arie, J. et al; "Human Activity Recognition Employing Indexing" IASTED Conference on Computer Graphics and Imaging (CGIM '01), Honolulu HI, pp. 222-227 (Aug. 2001).

Ben-Arie, J. et al; "Human Activity Recognition Using Multidimensional Indexing" IEEE Transactions on Pattern Analysis and Machine Intelligence 24(8):1091-1103 (Aug. 2002).

Ben-Arie, J. et al; "View-Based Human Activity Recognition by Indexing and Sequencing" IEEE Computer Society, 2001 Conference on Computer Vision and Pattern Recognition (CVPR '01) vol. 2, pp. 78-83, Kauai, HI (Dec. 2001).

Bobick, A. et al; "An Appearance-Based Representation of Action" Proceedings of Thirteenth International Conference on Pattern Recognition, pp. 307-312 (Aug. 1996).

Bobick, A. et al; "The Recognition of Human Movement Using Temporal Templates" IEEE Transactions on Pattern Analysis and Machine Intelligence 23(3):257-267 (Mar. 2001).

Corradini, A.; "Dynamic Time Warping for Off-line Recognition of a Small Gesture Vocabulary" In proceedings of the 2nd IEEE International Conference on Recognition, Analysis and Tracking of Face and Gesture in Real-Time Systems, Vancouver, B.C., Canada, pp. 82-89 (2001).

Darrell, T. et al; "Space-Time Gestures" Proceedings of the IEEE Conference on Computer Vision and Pattern Recognition, pp. 335-340 (1993).

Fujiyoshi, H. et al; "Real-time Human Motion Analysis by Image Skeletonization" Proceedings of the Workshop on Application of Computer Vision, pp. 15-21 (Oct. 1998).

Galata, A. et al.; "Learning Variable-Length Markov Models of Behavior" Computer Vision and Image Understanding 81(3):398-413 (Mar. 2001).

Gavrila, D.M.; "The Visual Analysis of Human Movement: A Survey" Computer Vision and Image Understanding 73(1):82-98 (Jan. 1999).

Haritaoglu, I. et al; "W4: Real-Time Surveillance of People and Their Activities" IEEE Transactions on Pattern Analysis and Machine Intelligence 22(8):809-830 (Aug. 2000).

Ivanov, Y. et al; "Recognition of Visual Activities and Interactions by Stochastic Parsing" IEEE Transactions on Pattern Analysis and Machine Intelligence 22(8):852-872 (Aug. 2000).

Moeslund, T. et al; "A Survey of Computer Vision-Based Human Motion Capture" Computer Vision and Image Understanding 81(3):231-268 (Mar. 2001).

Pandit, P.; "View-based Human Activity Recognition" Masters Project, University of Illinois at Chicago, Department of Electrical Engineering and Computer Science (May 2001).

Polana, R. et al; "Recognizing Activities" Proceedings of the IEEE Conference on Computer Vision and Pattern Recognition, pp. 815-818 (1994).

Rabiner, L. et al; "Fundamentals of Speech Recognition" PTR Prentice-Hall, Inc., Englewood Cliffs, New Jersey (1993).

Sakoe, H. et al; "Dynamic Programming Algorithm Optimization for Spoken Word Recognition" IEEE Transactions on Acoustics, Speech, and Signal Processing, ASSP-26(1):43-49 (Feb. 1978).

Schlenzig, J. et al; "Vision Based Hand Gesture Interpretation Using Recursive Estimation" Proceedings of the 28th Asilmoar Conference on Signals, Systems and Computers, pp. 1267-1271 (1994).

Starner, T. et al; "A Wearable Computer Based American Sign Language Recognizer" In. Inte. Symp. on Wearable Computers, Boston, pp. 130-137 (Oct. 1997).

Wang, Z.; "Recognition of Generic Objects and Human Activities" Thesis, University of Illinois at Chicago, Department of Electrical Engineering and Computer Science (2000).

Yamato, J. et al; "Recognizing Human Action in Time-Sequential Images using Hidden Markov Model" in Proceedings Conference on Computer Vision and Pattern Recognition, pp. 379-385 (Jun. 1995).

Yang, M. et al; "Recognizing Hand Gesture Using Motion Trajectories" IEEE Conference on Computer Vision and Pattern Recognition, Fort Collins, CO, pp. 466-472 (Jun. 1999).

* cited by examiner

METHOD OF RECOGNITION OF HUMAN MOTION, VECTOR SEQUENCES AND SPEECH

RELATED APPLICATIONS

This application claims the benefit of U.S. Provisional Application No. 60/378,316 filed May 6, 2002. And claims the benefit of U.S. Provisional Application No. 60/381,002 filed on May 15, 2002. The entire teachings of these are incorporated herein by reference.

STATEMENT REGARDING FEDERALLY SPONSORED RESEARCH AND DEVELOPMENT

Parts of research related to the invention were sponsored by the National Science Foundation (NSF). According to the NSF patent regulations (45 CFR 650.9), the NSF gave me a waiver and agreed that I shall retain the rights to the invention and file a patent application. My case number is CV78 NSF Grant No. 02-454.

BACKGROUND OF THE INVENTION

A. Field of the Invention

The invention is a novel method for recognition of human motions. The invention also applies this method for vector sequence recognition and for speech recognition.

B. Description of Prior Art

Recognition of human motion and especially recognizing detailed human activities, is a relatively new research area with very few published works. A paper by Ben-Arie, J., Wang, Z., Pandit, P. and Rajaram, S., "Human Activity Recognition Using Multidimensional Indexing," IEEE Transactions on Pattern Analysis and Machine Intelligence (PAMI), Vol. 24, No. 8, pp. 1091-1105, August 2002 is among these few. An additional excellent reference which conducts an intensive survey on the different methodologies for visual analysis of human movement is in D. M. Gavrila. "The visual analysis of human movement: A survey," Computer Vision and Image Understanding, 73(1):82-98, 1999. Gavrila groups them into 2D approaches with or without explicit shape models and 3D approaches. The 2D approach without explicit shape models is based on describing human movement in terms of simple low-level 2D features instead of recovering the pose. The second approach, which is a view-based approach uses explicit shape models to segment, track and label body parts. The third approach attempts to recover the 3D poses over time. More recently, there has been a survey by T. B. Moeslund and E. Granum "A survey of computer vision-based human motion capture," Computer Vision and Image Understanding, 81(3):231-268, March 2001, which describes various computer vision-based human motion capture. They elaborate about the various categories of human motion capture namely Initialization, Tracking, Pose Estimation and Recognition. Human motion recognition is classified into static and dynamic recognition. Static recognition is based on using spatial data, one frame at a time and dynamic recognition uses the temporal characteristics of the action. Our method of Recognition Indexing & Sequencing (RISq) is based on a novel approach that differs from all the methods surveyed above.

Unlike our method, which can classify many different activities, past works focused on recognition of only few activity classes. H. Fujiyoshi and Alan J. Lipton in "Real-time human motion analysis by image skeletonization," Proc. of the Workshop on Application of Computer Vision, October 1998, use skeletonization to extract internal human motion features and to classify human motion into "running" or "walking" based on the frequency analysis of the motion features.

M-H. Yang and N. Ahuja. in "Recognizing hand gesture using motion trajectories," IEEE Conference on Computer Vision and Pattern Recognition, pages 466-472, June 1999, apply Time-Delay Neural Network (TDNN) to hand gesture recognition and achieve quite high recognition rate a method akin to Dynamic Time Warping (DTW). DTW was also used by works such as: Sakoe H., Chiba S., in "Dynamic Programming Optimization for Spoken Word Recognition", IEEE Transactions on Acoustics, Speech, and Signal Processing, 34(1):4349, 1978. J. Schlenzig, E. Hunter, and R. Jain in "Vision based hand gesture interpretation using recursive estimation," Proceedings of the 28th Asilmoar Conference on Signals, Systems and Computers, 1994, use Hidden Markov Model (HMM) and a rotation-invariant imaging representation to recognize visual gestures such as "hello" and "good-bye". HMMs are used by J. Yamato, J. Ohya, and K. Ishii in "Recognizing human action in time-sequential images using hidden markov model," in Proceedings Conference on Computer Vision and Pattern Recognition, pages 379-385, June 1992, for recognizing human action in time sequential images. HMMs were also utilized by Starner and Pentland to recognize American Sign Languages (ASL). Darrell and Pentland applied dynamic time warping to model correlation for recognizing hand gestures from video. R. Polana and R. Nelson in "Recognizing activities" Proc. of the IEEE Conf. on Computer Vision and Pattern Recognition, pages 815-818, 1994, use template matching techniques to recognize human activity.

Motion Energy Images are used by A. F. Bobick and J. W. Davis in "An appearance based representation of action" in Proc. of Thirteenth International Conference on Pattern Recognition, August 1996, for recognition. I. Haritaoglu, D. Harwood, and L. S. Davis in "w4: Real-time surveillance of people and their activities" in IEEE Transactions on Pattern Analysis and Machine Intelligence, 22(8):809-830, August 2000, implemented a system for human tracking and activity recognition, in which the activity recognition part is mainly based on analysis of the projected histograms of detected human silhouettes. This system classifies human poses in each frame into one of four main poses (standing, sitting, crawling/bending, lying) and one of three view-based appearances (front/back, left-side and right side) and activities are monitored by checking the pose changes over time.

In another work, Y. A. Ivanov and A. F. Bobick in "Recognition of visual activities and interactions by stochastic parsing" in IEEE Transactions on Pattern Analysis and Machine Intelligence, 22(8):852-871, August 2000, recognize generic activities using HMM and stochastic parsing. These activities are first detected as a stream of low level action primitives represented using HMM and then are recognized by parsing the stream of primitive representations using a context-free grammar. A. F. Bobick and J. W. Davis in "The recognition of human movement using temporal templates" in IEEE Transactions on Pattern Analysis and Machine Intelligence, 23(3), March 2001 recognized human activity by matching temporal templates against stored instances of views of known actions.

More recently, Galata et al. [9] A. Galata, N. Johnson, and D. Hogg in "Learning variable-length Markov models of behavior" in Computer Vision and Image Understanding, 81(3):398-413, March 2001, use Variable Length Markov Models (VLMM) for modeling human behavior. They use VLMMs because of their more powerful encoding of temporal dependencies. Our indexing based recognition RISq approach differs from all the above-mentioned works since it determines the best matching activity in a single indexing operation, is invariant to activity's speed and requires only few very sparse samples of the activity for complete recognition.

String matching techniques that allow recognition of input strings as similar to stored collection of model strings stored in a database, are also described in several patents such as U.S. Pat. No. 5,577,249 or in U.S. Patent Application number 20020181711. However, they significantly differ in their method from our method. U.S. Pat. No. 5,577,249 employs random partitioning for the recognition and U.S. Patent Application number 20020181711 finds similarity by generating K-means cluster signatures.

Other patents that relate to human motion recognition are mostly adapted to recognition of simple actions such as hand gestures as an input to a computer etc. and not for recognition of human motion such as articulated human activity. They also have recognition methods that substantially differ from our method. Such are U.S. Pat. Nos. 6,256,033, 5,581,276, 5,714,698 and 6,222,465. U.S. patents that relate to indexing and speech recognition such as: U.S. Pat. Nos. 5,386,492, 5,502,774, 5,621,809, 6,292,779, 6,542,869, 6,371,711, and U.S. patent application 20020052742 or 20020062302 apply methods that are different from our invention.

The prior art fails to provide satisfactory solutions to a cardinal problem in the recognition of human motion. Human motion has noticeable variations in speed that occur all the time. The speed varies between person to the next and even during performance of the same person. All the prior methods are based on equally fast rate of sampling of both input and model motions. Prior recognition algorithms take into account the temporal properties of the motion since they rely on temporal correlation as the basic principle of matching, whether the algorithm is continuous or discrete. The only prior method that tried to cope with speed variations was Dynamic time warping (DTW) this is a dynamic programming technique used to create nonlinear warping function between the input time axis and the model time axis. DTW is substantially different from our method requires a lot of computations that not always converge and also is still quite sensitive to large variations of speed. In contrast, our invention proposes a method that eliminates entirely the time factor from the recognition and replaces it with sequencing. Another innovation of our approach, i.e. the substantially different rate of sampling, enables to recognize human motions just from very few samples. This result was verified by us experimentally. Similar advantages are expected form the application of the method towards speech recognition.

SUMMARY OF THE INVENTION

The present invention is a novel method that enables recognition of an input human motion as being the most similar to one model human motion out of a collection of model human motions that are stored in a database. The invention also includes a general method for recognition of vector sequences and a method for recognition of speech.

For the recognition of human motion, both the input and the model human motions are represented by vector sequences that are derived from samples of recorded and measured trajectories of human body parts while performing the motions. In the preferred embodiment of the invention the trajectories are of the angular poses of human body parts. Since the skeletal structure of the human body consists of bones connected to one another by flexible joints, the angular poses of human body parts uniquely determine the entire posture of the human body. Hence, a sequence of samples of the angular poses of body parts and their derivatives, provide all the relevant information about the motion being performed.

In the preferred embodiment of the invention with regards to recognition of human motion, we first measure and sample the angular poses of the body parts in performing model motions. Next, we represent them by model vectors that include also the derivatives of each pose. After that, we separate the model vectors into sub-vectors that correspond to the sub-sets of body parts and store the model sub-vectors of each subset in a separate hash table. Then, we index separately into each hash table using input motion sub-vectors that were acquired from the input motion, in the same manner as the model sub-vectors, and retrieve the model sub-vectors that are similar to the input sub-vectors. The next step, is to merge the model vectors retrieved and to find the best matching of the input vector sequence with each of the models. The optimization algorithm used is based on dynamic programming and also employs a special procedure that includes only matching sequences that fulfill the sequencing requirement. The model with the highest matching score with the input sequence is recognized as the motion class most similar to the input. The methods for vector sequence recognition and for speech recognition are similar, but do not divide the vectors into sub-vectors.

One of the main innovative features of the invention is the use of sampling rates which are substantially different for the input motion and for the model motions. In one option, we propose to sample the input motion with slow-sparse rate and the model motion with fast rate. In the second option we propose to switch the rate, i.e. a fast sampling rate for the input and slow-sparse rate for the models. The reasons behind the substantial difference in sampling rates are quite important and provide significant advantages.

Firstly, it is not required to sample both the input and the models with fast rate of sampling—as all the other motion recognition methods do. In fact, when one kind of motion is sampled sparsely, the recognition of human motion is still quite robust, and with probability for errors, which is very low.

Secondly, matching a sequence of slow-sparse samples to a dense sequence of samples (obtained by fast sampling rate) enables to recognize input motions that are in the same class as one of the models, but significantly differ in their speed. This is because in our approach, the time periods between the sparse samples are of no consequence, since each sample of the sparse sequence is matched to a sample of the dense (fast) sequence without relevance to their timing. The speed can even vary during the motion and our method will still be able to recognize the motion. This is important since the same human motions in performing the same actions, naturally vary. Other recognition methods did not eliminate the time factor from the motion, as we do in this invention, and therefore have severe problems when the input speed does not match the model speed.

Thirdly, sparse sampling requires to match only very few sparse samples for robust recognition. Practically, only 4-5 sparse pose samples are required for highly accurate recognition of human motions, as we found in experiments elaborated in our paper: Ben-Arie, J., Wang, Z., Pandit, P. and Rajaram, S., "Human Activity Recognition Using Multidimensional Indexing," IEEE Transactions on Pattern Analysis and Machine Intelligence (PAMI), Vol. 24, No. 8, pp. 1091-1105, August 2002. This results in noticeable savings in the computations required. Both the first and the second options offer similar efficiency in reducing the computational load in the recognition process.

Another innovative feature of the invention is the requirement for sequencing in matching two vector sequences. The sequencing requirement do not allow to match two vector sequences which are not in the same order. Gaps are allowed but not reversals in ordering of matching vector pairs. It means that the imaginary arcs that connect each input vector to its matching model vector in the matching vector pair, never cross another imaginary arc that belong to another vector pair. This requirement is of great consequence since it guarantees that matching vector pairs that contribute to the matching scores of sequences matched must have the same sequence. It means that matching motions must have the same sequence of poses, but not necessarily the same speed. Actually, the sequencing requirement with the large variation in sampling rates, were introduced in order to eliminate entirely the time factor in matching vector sequences. As mentioned in (below), this enables to recognize human motions, vector sequences and speech that vary in their speed relative to their stored models.

An additional novel feature of the invention is the requirement that vectors included in the sparse sequence, are matched only to one vector in the fast sequence. This requirement severely constrains the number of possible vector pair sequences in the optimization.

In addition to previous features, another unique and novel feature of the invention is the introduction of separate hash tables and separate indexing for each sub-set of body parts. This feature allows to recognize human motions even if poses of several body parts are not known due to occlusion or missing measurement information. This feature is quite important in practice, since missing pose information occurs frequently.

As far as we have searched, all the 4 features of our invention, mentioned above are innovative and unique.

DETAILED DESCRIPTION OF THE INVENTION

Figure 1:
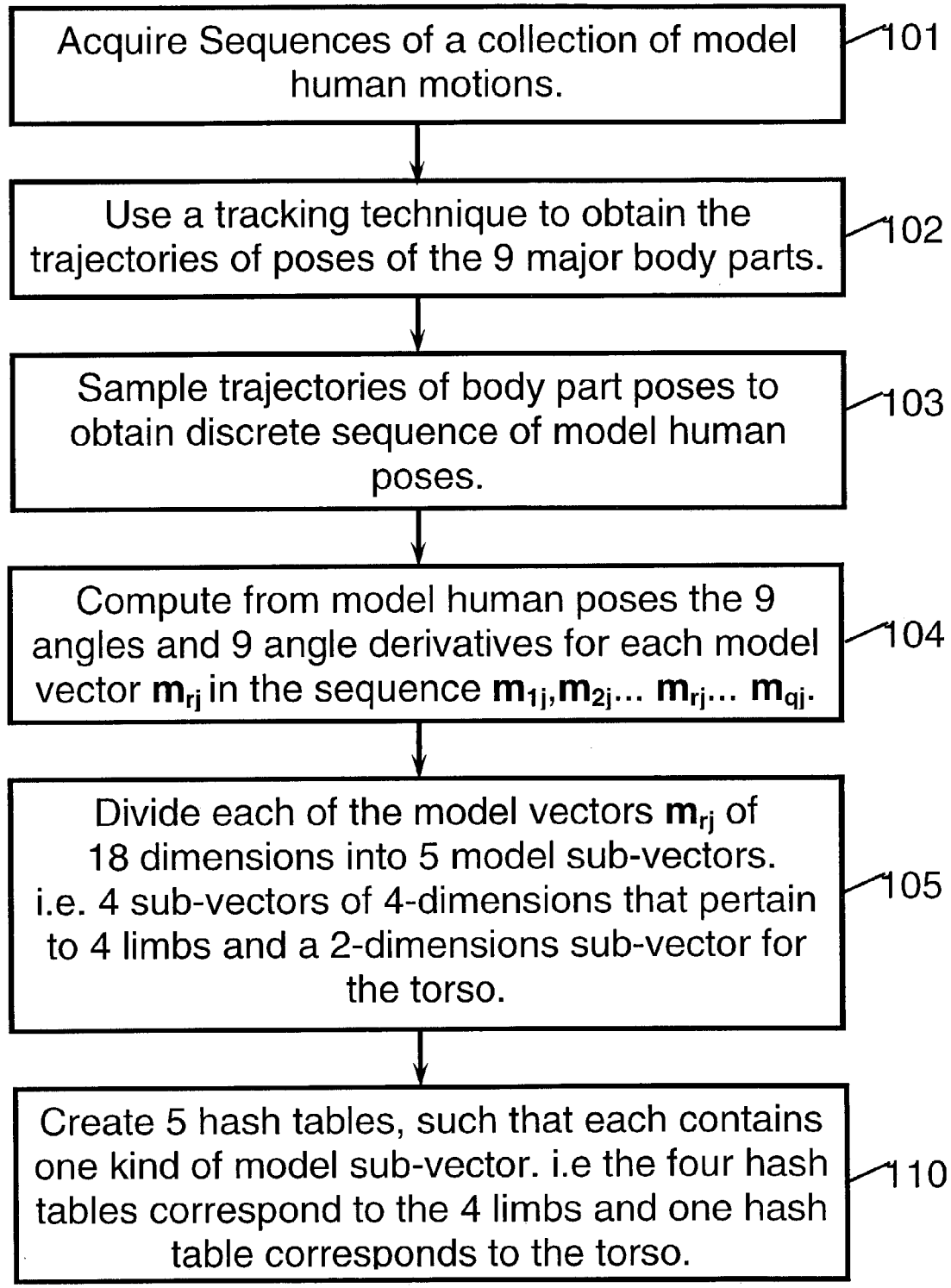
FIG. 1 is a schematic block diagram describing the preferred steps suggested in order to create 5 hash tables that store a collection model sub-vectors. These 5 sub-vectors represent the poses of the 4 limbs and the torso of humans in performing a corresponding collection of model human motions.

This invention is mostly focused on methods for recognition of human motion. However, similar methods are also proposed for other applications that include speech recognition and recognition of vector sequences per se.

Hence, a major objective of the invention is to recognize inputs of human motion and to classify each one of these inputs as most similar to one member of a collection of stored model human motions. The manner of acquisition of the motions does not perturb the principles of the invention. Human motion can be measured and tracked by a large variety of systems and sensors. Depending whether these systems are attached to the subject's body or is installed in the subject's environment, these systems can be classified as internal or external. Examples of external measurement systems are 2D or 3D video, optical tracking of markers such as infra-red or LEDs (light emitting diodes), gravitational or inertial sensors, electromagnetic sensors and others. Examples of internal systems are data-gloves or overall suits equipped with devices such as piezo-resistive flex sensors. Such devices can measure the relative orientation between various body parts. There is a large variety of other devices that are applied for relative orientation measurement. These include fiber optic or light-tube flexes, potentiometers, shaft encoders, short range mutual inductance devices, Hall effect devices, electro-myographic devices (instruments that measure muscular contractions) and others. Most of these devices are quite small and do not require external source, thus provide almost unlimited space in which the person can move and perform. In our preferred embodiment we suggest to acquire the motion by tracking body parts in video.

To recognize human motion one ought to acquire detailed information that pertains to the movements of all the body parts involved in such motion. For such a purpose, the human body is usually represented by a skeletal model of all the bones, which are connected by flexible joints. Thus, motion of body parts such as arms, legs or fingers can be described as motion of the corresponding skeletal part. Since every bone is connected to another bone of the skeleton via a flexible joint, the skeletal structure can be represented by a tree graph. Where the tree's nodes represent bones and the tree's arcs correspond to joints. The root of the tree is usually defined as the sacrum (or sacroiliac joint) and all the other bones are siblings of the root. The pose in 3D space of any bone can be decomposed into 3D position and 3D orientation. Correspondingly, movement of any bone can be described as 3D translation plus 3D rotation. But, since all the bones are connected to one another by flexible joints, their translations are not independent and are a function of the predecessor's translation of each bone in the tree structure. Hence, the only independent 3D translation is of the root's. All the other body's parts independent poses and motions are determined entirely by their 3D angular orientations and their 3D angular velocities. Such a representation is employed by the widely used Virtual Reality Modeling Language (VRML). The VRML is mostly used for computer animation of humanoids and avatars and in video compression.

The rudimentary representation of human motion is by the trajectories of various body parts that participate in the motion. These trajectories describe the 3D poses of the body parts as functions of time. We find that major human activities such as walking, running, jumping etc. can be characterized and later robustly recognized by the trajectories of 9 major body parts. These include the upper arms, the forearms, the thighs, the calves, and the torso. Evidently, there are many other human motions that can be accurately represented by 3D trajectories of other body parts such as the hands, fingers etc. As elaborated above, the 3D poses and velocities of body parts that participate in human motion, can be accurately described by the angles of their skeletal joints and their derivatives.

FIG. 1 describes the suggested steps of the preferred embodiment of our method of acquiring a collection of model human motions. The various models of human motion stored in this collection represent corresponding classes of human motion. These models are later tentatively matched with an input motion of unknown class. The matching quality is expressed by matching scores, which reflect the similarity between each model and the input motion. The input motion is recognized as most similar to the model with the highest matching score.

In our preferred embodiment, we suggest to use an inverse function of the distance between the vectors that represent the input motion i.e. $t_{nk}$ and the corresponding model vector $m_{rj}$. Such an inverse function, reflects the quality of matching, or in other words, the similarity between $t_{nk}$ and $m_{rj}$. In our preferred embodiment, we employ an inverse function such as $1/[a+d(t_{nk}, m_{rj})]$, where $d(t_{nk}, m_{rj})$ is the Euclidean distance between $t_{nk}$ and $m_{rj}$ and a is a positive constant.

The motion models are acquired by asking human subjects to perform various activities in a controlled environment. This step is described by block 101. Next, tracking techniques are used to obtain the trajectories of the 3D poses of the major body parts that participate in the motions modeled. This step is described by block 102. The next step, described in block 103, is to sample the trajectories of all the body parts tracked. The sampling rate for the model motion can be significantly different from the sampling rate used for the input motion.

In this invention, we propose two options for the sampling rates. The first option is that the input motion is sampled at a slow-sparse sampling rate and the collection of model motions are sampled at a fast rate. In the second option, the sampling rates are switched. The reasons behind the introduction of different sampling rates in this invention are quite cardinal, and actually provide important advantages. Firstly, it is not necessary to sample both the input and the models with fast rate of sampling—as all the other motion recognition methods do. In fact, recognition of human motion is quite robust, and with very low probability for errors, even when one kind of motion is sampled sparsely. Secondly, matching a sequence of sparse samples to a dense sequence of samples (obtained by fast sampling rate) enables to recognize input motions that are in the same class as one of the models, but significantly differ in their speed. The speed can even vary during the motion and our method will still be able to recognize the motion. This is important since the same human motions in performing the same actions, naturally vary in their speeds from one person to the other. Thirdly, sparse sampling requires to match only few sparse samples for robust recognition. This results in noticeable savings in the computations required. Additional details on the different sampling rates are provided.

The next step in the construction of the hash tables for the collection of model motions, is described in block 104. In this step, the sampled poses of human body parts are converted into joint angles and joint angular derivatives. Computing transformations from sampled poses to angles is necessary if the sampled poses are not originally measured in angles. For example, if the poses of body parts are measured by their 3D locations, the joint angles can be computed from these locations if the anthropomorphic proportions or measures of the human subject performing the motions are known.

The angular derivatives are usually extracted from the differences of two or more successive samples. The order of the derivatives determines the minimal number of successive samples that are needed. For first derivatives two successive samples are the minimum and the derivative is computed from the difference between the samples. For second derivatives, 3 samples are the minimum, and so on. The second derivative d"(t) is proportional to $d"(t_2)=d(t_1)-2d(t_2)+d(t_3)$ where $d(t_1)$ is the first sample, $d(t_2)$ is the second and $d(t_3)$ is the third. However, we do not see practical use for derivative orders higher than 2. Computing derivatives for slow-sparse sampling requires to take two or more successive samples at fast rate at any point in time that the slow-sparse sample is taken. Thus slow-sparse sampling actually results in "bursts" of two or three fast samples that are separated by relatively long time periods.

In the preferred embodiment described in block 104, the poses of the 9 major body parts and their first derivatives, are transformed into vectors of 18 dimensions. For the model motions, these vectors are denoted by $m_{rj}$ and the model vector sequence that represents the entire model motion is denoted by $M_j$ where subscript j is the model number in the collection, and subscript r is the location of $m_{rj}$ within the sequence.

In the preferred embodiment that is described by block 105, it is suggested to separate the model vectors into 5 model sub-vectors. Four sub vectors have 4 dimensions that represent the angular poses and their derivatives of the 4 limbs. Four dimensions are required since the each of the limbs has two major body parts. The legs are divided into thighs and calves and the arms are divided into upper arms and forearms. The sub-vector that pertains to the torso is just two dimensional. The reason behind this separation is that it enables to vote separately on each body part and if one or more body parts are occluded, the matching scores aggregated from the other body parts can still amount to robust recognition. In the preferred embodiment of other applications such as speech or vector sequence recognition, such a separation is not necessary.

The sub-vectors sequences resulting from 105 are stored in 5 separate hash tables. The creation of these hash tables is described in block 110. These hash tables have bins that each is addressed by a different address vector. The address vectors for the 4 dimensional hash tables are 4 dimensional and for the 2 dimensional hash table are 2 dimensional. The values of the address vectors for each hash table can be obtained by a Vector Quantization (VQ) algorithm. In the VQ algorithm, all the sub-vectors that belong to the table from all the model sequences are used to find a small, predetermined number of quantized vectors that represent the whole sub-vector collection with minimal mean square error. These quantized vectors are then used as address vectors for the bins. Whenever, the table is addressed, the sub-vectors stored in the addressed bin are retrieved. All the retrieved vectors are similar to the addressing vector in the sense that they have relatively low distance from the addressing vector. These retrieved model sub-vectors are merged to a single model vector for each matching ($t_{nk}$, $m_{rj}$) and their vector matching scores are evaluated after merging. The reason behind this structure is to enable recognition when some of the body parts are missing. In such a case, only the body parts with known sub-vectors are combined.

Figure 2:
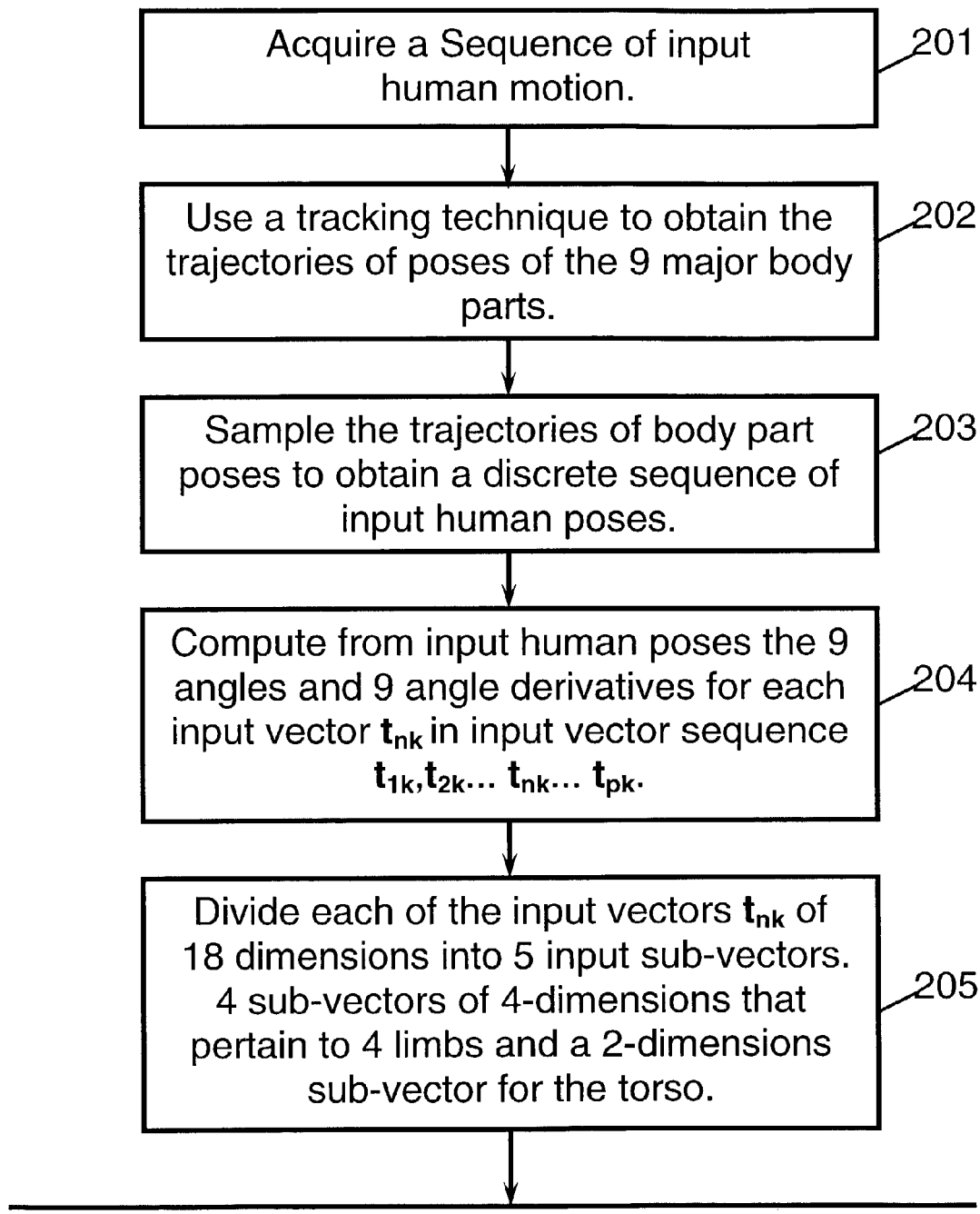
FIG. 2A is a schematic block diagram illustrating the first 5 steps suggested as a preferred method for recognition of an input human motion.
FIG. 2B is a schematic block diagram illustrating the next 5 steps, following the steps in FIG. 2A, that are suggested as a preferred method for recognition of an input human motion.
FIG. 2C is a schematic block diagram illustrating the subsequent 3 steps, following the steps in FIG. 2B that are suggested as a preferred method for recognition of an input human motion.
Figure 2:
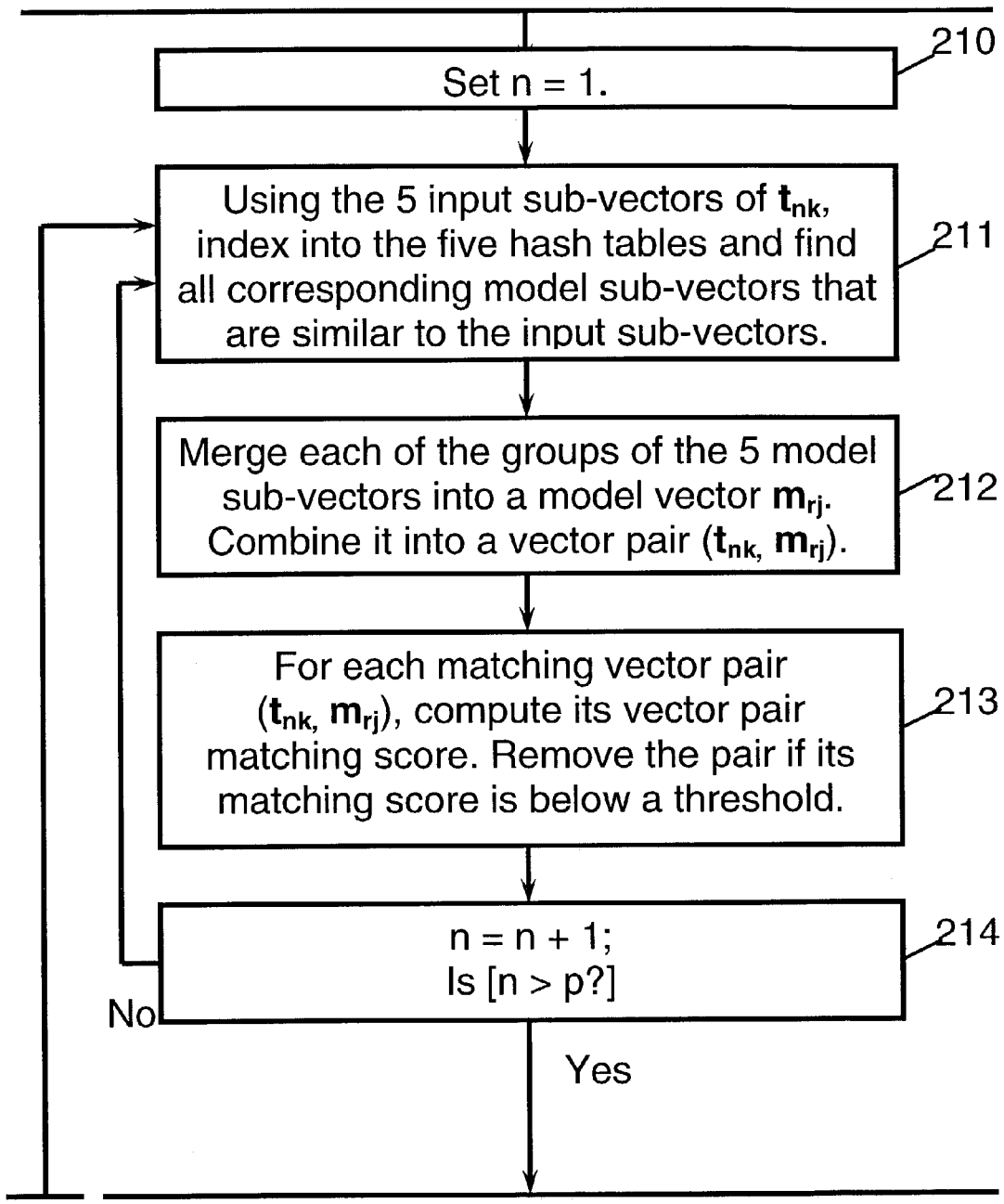
Figure 2:
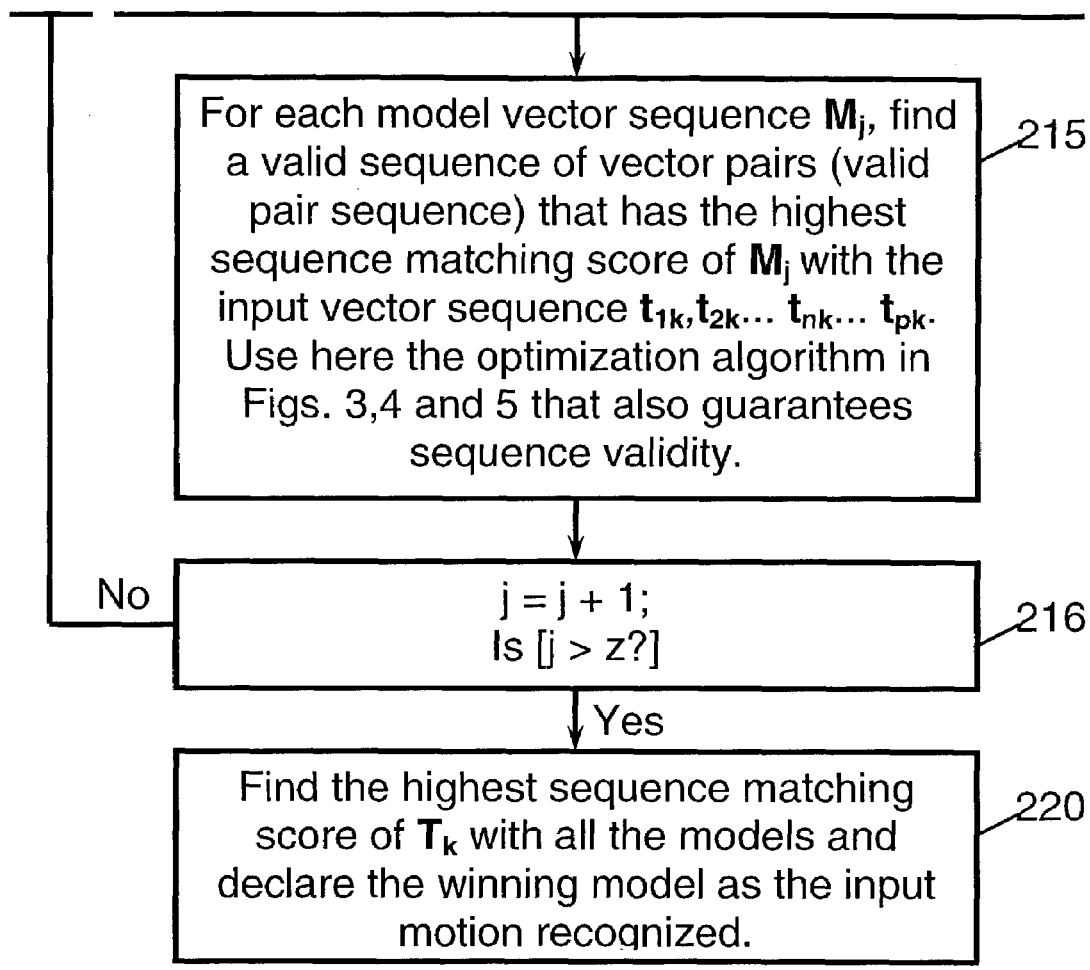

Since both input and model motions are represented by vector sequences, this task is equivalent to finding the best matching between a given input vector sequence and one member of a collection of model vector sequences. The preferred embodiment of the invention involves a recognition method that employs indexing into hash tables followed by an optimization-sequencing algorithm that finds the valid-sequence of matching vector pairs with the highest total sum of vector matching scores. The initial preparation of the hash tables used in the algorithm is illustrated in FIG. 1, which is described above. FIG. 2A, FIG. 2B, and FIG. 2C outline the various steps involved in the recognition process. The preferred approach to solve the optimization-sequencing problem is described with the help of drawings FIG. 3, FIG. 4 and FIG. 5A and FIG. 5B.

As mentioned above, FIG. 2A, FIG. 2B and FIG. 2C describe the general steps required in the recognition process. The actions that are described in steps 201, 202, 203, 204 and 205 correspond exactly to the steps described in steps 101, 102, 103, 104 and 105 in FIG. 1, except that now they are implemented on the input motion instead. The model vectors in FIG. 1 are replaced by the input motion vectors $t_{nk}$ and the input vector sequence is denoted here by $T_k$ where the subscript k denotes the serial number of the input vector sequence and the subscript n signifies the location of $t_{nk}$ within $T_k$.

In block 210 the subscript n is initialized to point the first input vector $t_{1k}$ whose sub-vectors are used in block 211 for indexing. Block 211 describes the indexing of the 5 input sub-vectors into the 5 hash tables that takes place as an initial step in the recognition. Each such indexing yields groups of 5 model sub-vectors that are similar to the 5 input sub-vectors used for the indexing. Each of the groups of 5 model sub-vectors retrieved, are merged into a complete model vector and coupled with the input vector that was used for the indexing, to create a vector pair ($t_{nk}$, $m_{rj}$) in block 212. In block 213, the matching scores of these vector pairs are computed and the pairs are removed if the pair matching score is smaller than a predetermined threshold.

In block 214, k is incremented by 1 and if k is not greater than p the algorithm returns to block 211. And if k is greater than p the algorithm moves to block 215. In block 215 the optimal matching score between the input vector sequence $T_k$ and the model vector sequence $M_j$ is found using the optimization algorithm that is described in detail in FIGS. 3, 4, 5A and 5B. The optimization algorithm also guarantees that the pair sequence found is also valid, i.e. it fulfills the sequencing requirement. In block 216 the subscript j is incremented by 1 and if j is not greater than z, which is the total number of models in the collection of model vector sequences $\{M_j\}$ the algorithm returns to block 211. And if j is greater than z the algorithm moves onwards to block 216. In block 220 the optimal matching scores that pertain to all the z models in the collection of model motions are compared. The model with the highest matching score is selected as the one that is most similar to the input motion i.e. the input motion is recognized as belonging to the class of model motions represented by the winning model.

Figure 3:
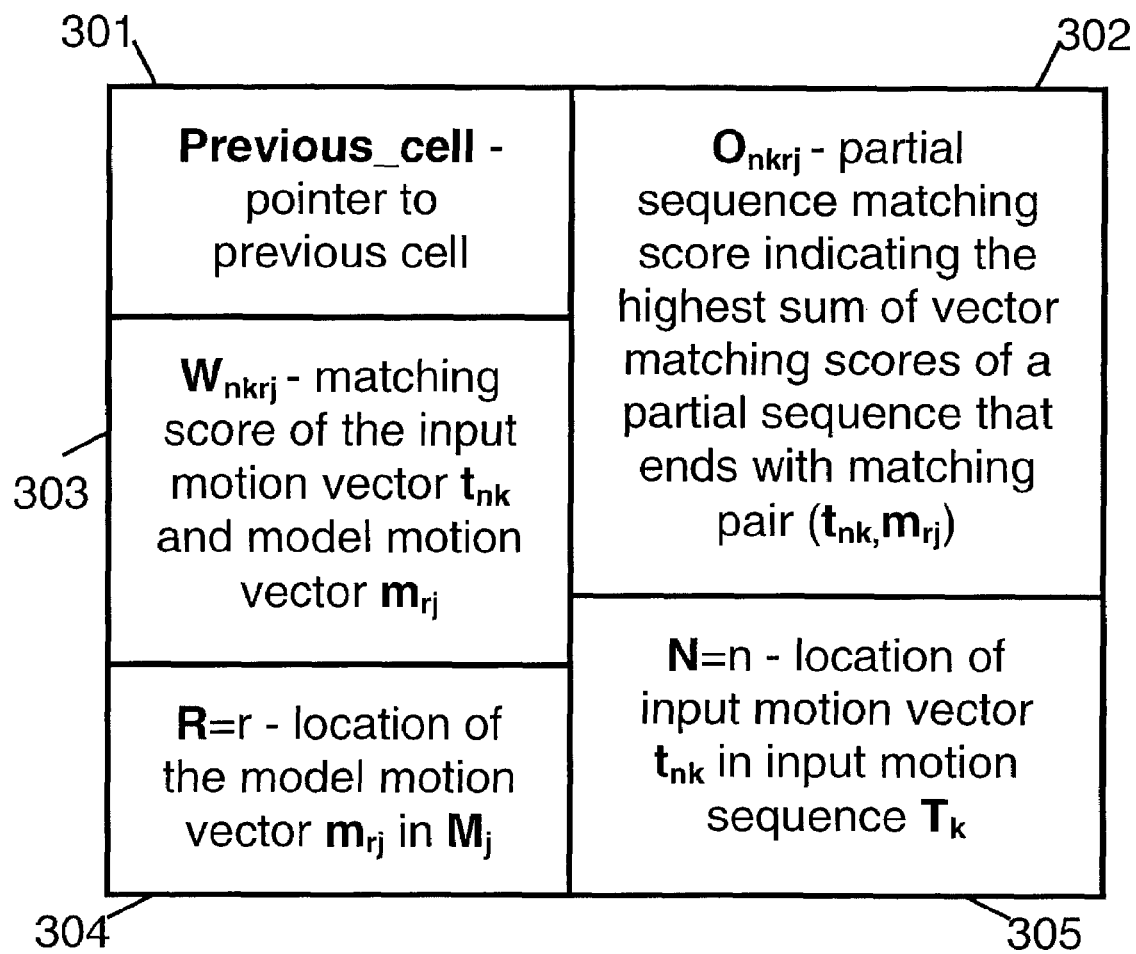
FIG. 3 is the schematic drawing of the data structure used in the process of sequence matching. This data structure consists of 5 variables stored in a cell. The cell is a component of array $A_j$.

In order to find the highest total sum of vector matching scores between the input vector sequence and a model vector sequence, we use in the optimization-sequencing algorithm a 5 variable data set that is attached to each input-model matching vector pair. These vector pairs, which are created from any combination of input and model vectors that have a matching score above some predetermined threshold. These matching vector pairs are arranged in a sequence represented by the array $A_j$. FIG. 3 describes the data set henceforth called the cell. The cell is the basic building block of array $A_j$, which is an array of cells and will be described in the subsequent section. Each cell corresponds to a matching input-model pair and includes the values of 5 variables that represent the following information:

(1) 301—the first variable is Previous_cell, it is a pointer to the location of the previous cell in the array $A_j$.
(2) 302—the second variable is $O_{nkrj}$, which is the partial sequence matching score indicating the highest sum of vector matching scores of a partial vector pair sequence that ends with the cell related matching vector pair, i.e. the pair of input vector matching with model vector that are related to the cell.
(3) 303—the third variable is $W_{nkrj}$, which stores the vector pair's matching score, i.e. the matching score of the input motion vector and model motion vector that are related to the cell,
(4) 304—the fourth variable is R, which stores the location in the sequence $M_j$ of the model vector related to the cell.
(5) 305—the fifth variable is N, which stores the location of the input vector within the input motion sequence $T_k$.

The array $A_j$ as mentioned earlier is made up of cells and contains one cell for each vector matching pair composed of the input vector sequence and the model vector sequence in consideration.

Figure 4:
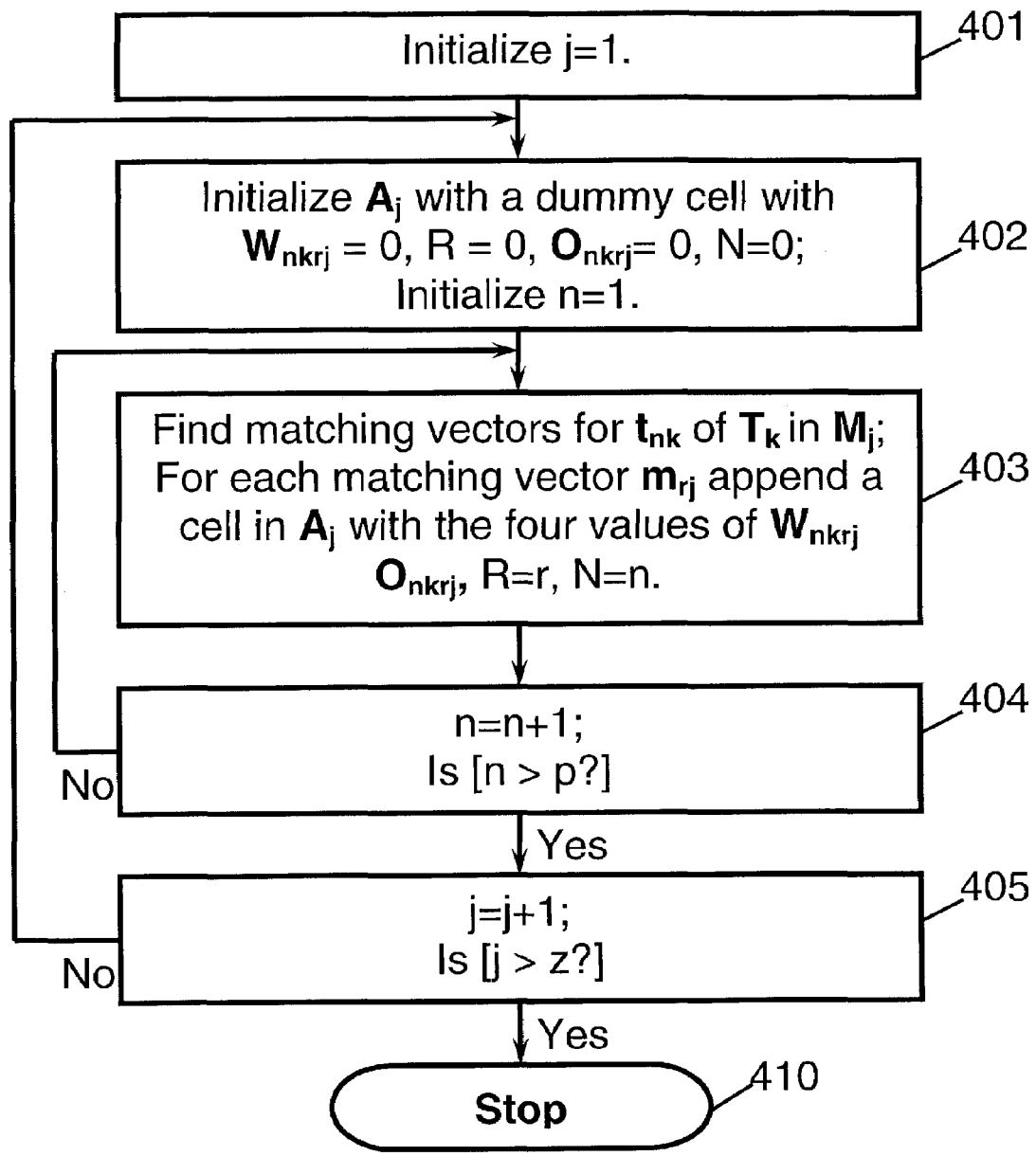
FIG. 4 is the flow chart describing the construction of the array set $\{A_j\}$. Each array $A_j$ in the set corresponds to another model $M_j$.

The construction of the array $A_j$ is illustrated in the flow chart FIG. 4. In order to describe this construction process and subsequent matching process, we assume that the input vector sequence $T_k$ contains the sequence of vectors ($t_{1k}$,$t_{2k}$ ... $t_{nk}$ ... $t_{pk}$), which is being matched with the model vector sequence $M_j$ containing the sequence of vectors ($m_{1j}$,$m_{2j}$ ... $m_{rj}$ ... $m_{qj}$). The variable j holds the information of the current model motion in consideration. It is initialized to 1 as depicted in 401. The array $A_j$ is initialized 402 by adding to it a null cell that depicts the null matching of $t_{0k}$ with $m_{0j}$, which are two null vectors. All the variables of the null cell are set to zero. Cells are appended to the array $A_j$ for each matching pair of $t_{nk}$ with $m_{rj}$ with matching score above a certain threshold as depicted in 403. This process is repeated for all input vectors $t_{nk}$ in the sequence $T_k$ and stops when all the vectors in the input vector sequence has found all the matching model vectors in all the z models in the collection—as illustrated in 404 and 405. At the end 410 of this loop, the array $A_j$ holds all the required information for obtaining the highest sum of matching scores between a given input vectors sequence and the model vector sequence $M_j$. This construction procedure for $A_j$ has to be repeated for each model vector sequence $M_j$ that belongs to the collection of model vector sequences $\{M_j\}$ to form the set $\{A_j\}$.

As mentioned above, the objective of our optimization-sequencing algorithm is to find the highest sum of matching scores between the input vector sequence $T_k$ and model vectors sequence $M_j$. The algorithm actually finds a sequence of matching input model vector pairs which has the highest total sum of individual pair matching scores. The optimal sequence of matching vector pairs has also to fulfill a sequencing requirement that is defined next, in order to be considered as a valid vector pair sequence. The sequencing requirement has two options depending on which of the matching vector sequences is acquired at a slow-sparse sampling rate and which at a fast sampling rate.

The first option is that the input vector sequence $T_k$ is acquired at a slow-sparse rate of sampling and all the models in the collection $\{M_j\}$ are acquired at a fast rate of sampling. By the term "slow-sparse rate of sampling" we mean that the input human motion is sampled at timing instances that are separated by relatively long periods of time compared to the time periods that separate the "fast rate of sampling". It does not mean that the slow-sparse speed has necessarily a uniform slow rate. Sometimes it is advantageous to sample human motion at particular instances, when the pose of body parts is at extreme position or when the pose is indicative of the kind of motion being performed. A typical range for the time periods between samples is 0.4-1.2 seconds. In our experiments with human motion recognition we found that such sample spacing range was quite useful. The fast sampling rate in our experiments was uniform at about 30 samples per second. One of the major advantages of the method is that only few sampled human poses are required for correct recognition of human motion with very high probability. This property is proved in our paper Ben-Arie, J., Wang, Z., Pandit, P. and Rajaram, S., "Human Activity Recognition Using Multidimensional Indexing," IEEE Transactions on Pattern Analysis and Machine Intelligence (PAMI), Vol. 24, No. 8, pp. 1091-1105, August 2002.

Assuming in the first option, that the input motion is sampled at a slow-sparse rate and the collection of model motions are sampled at fast rate, the sequencing requirement demands that any possible permutation of two matching vector pairs ... $(t_{nk}, m_{rj})$ ... $(t_{ck}, m_{ej})$ ... included in a valid vector-pair sequence, has to fulfill the following 3 conditions: (I) c is not equal to n; (II) if c>n, then r≦e; (III) if c<n then e≦r. Any total matching score ought to include only pair matching scores that pertain to matching vector pairs that are included in a valid vector-pair sequence. The sequencing requirement actually guarantees that the imaginary arcs that connect each input vector to its matching model vector of the pair, never cross one another and that each input vector $t_{nk}$, which is included in a valid vector-pair sequence, is matched only to one model vector $m_{rj}$.

Assuming in the second option, that the collection of model motions are sampled a at slow-sparse rate and the input motion is sampled at a fast rate, the sequencing requirement demands that any possible permutation of two matching vector pairs ... $(t_{nk}, m_{rj})$ ... $(t_{ck}, m_{ej})$ ... included in a valid vector-pair sequence, has to fulfill the following 3 conditions: (I) r is not equal to e; (II) if e>r, then n≦c; (III) if e<r then c≦n. Any total matching score ought to include only pair matching scores that pertain to matching vector pairs that are included in a valid vector-pair sequence. The sequencing requirement actually guarantees that the imaginary arcs that connect each input vector to its matching model vector of the pair, never cross one another and that each model vector $m_{rj}$, which is included in a valid vector-pair sequence, is matched only to one input vector $t_{nk}$.

Both the first and the second options offer similar efficiency in reducing the computational load in the recognition process. In addition, the use of sparse-slow samples that are matched to fast samples conserving only the sequencing requirement, allows to match two vector sequences of the same motion but with entirely different speeds, or even with significantly varying speeds during the motion. Such a flexibility is quite important especially in recognition of human motion or speech that may vary in their speed from one person to the other or even with the same person.

Figure 5:
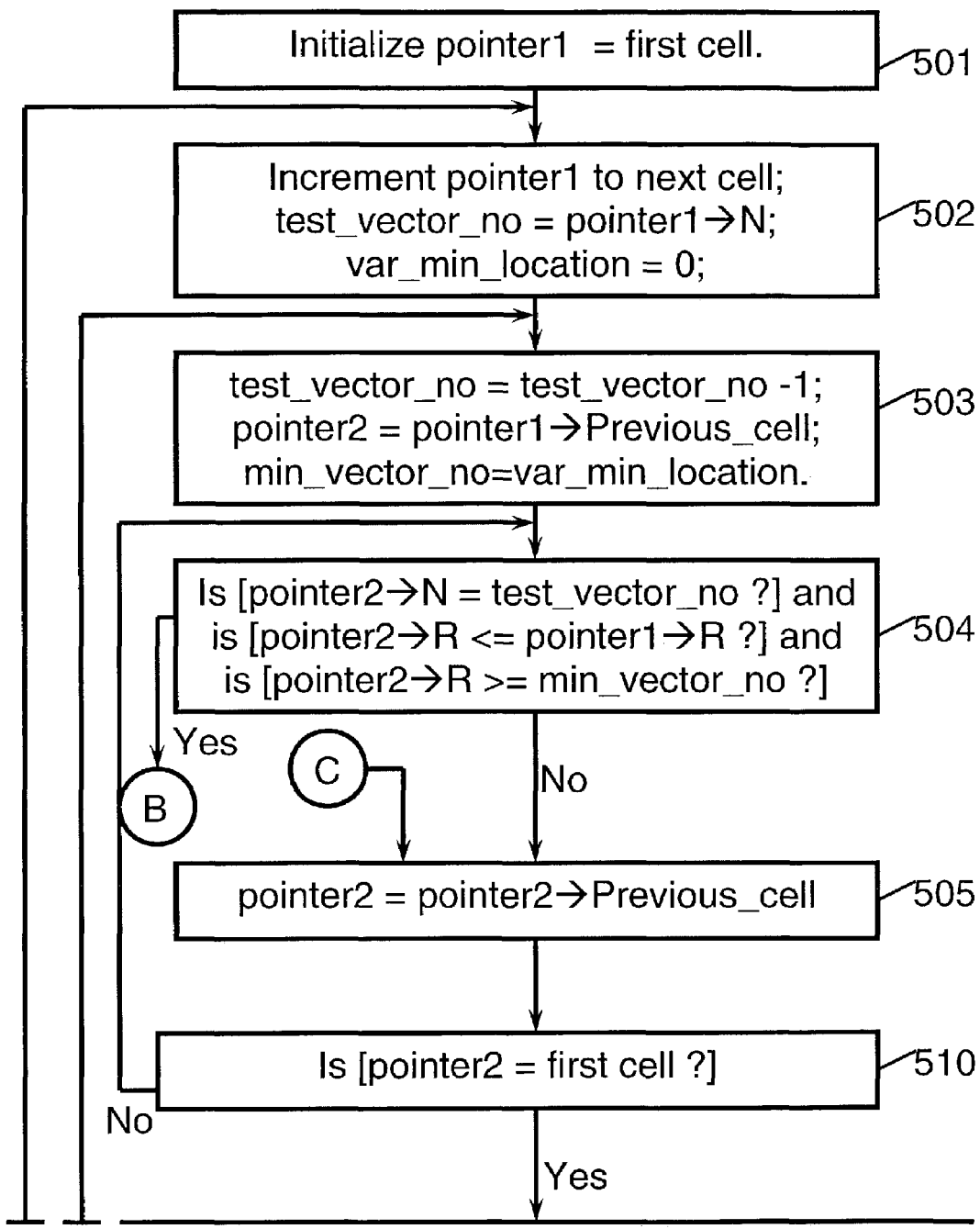
FIGS. 5A and 5B illustrate the flow chart of a preferred optimization algorithm for finding of the best matching score among all the possible valid sequences of matching vector pairs (valid pair sequences), constructed from vector pairs composed of a given input vector sequence $T_k$ and one model vector sequence $M_j$. The algorithm shown illustrates a preferred embodiment of the invention. The algorithm also guarantees the pair sequence selected, is valid (i.e. fulfills the sequencing requirement).
Figure 5:
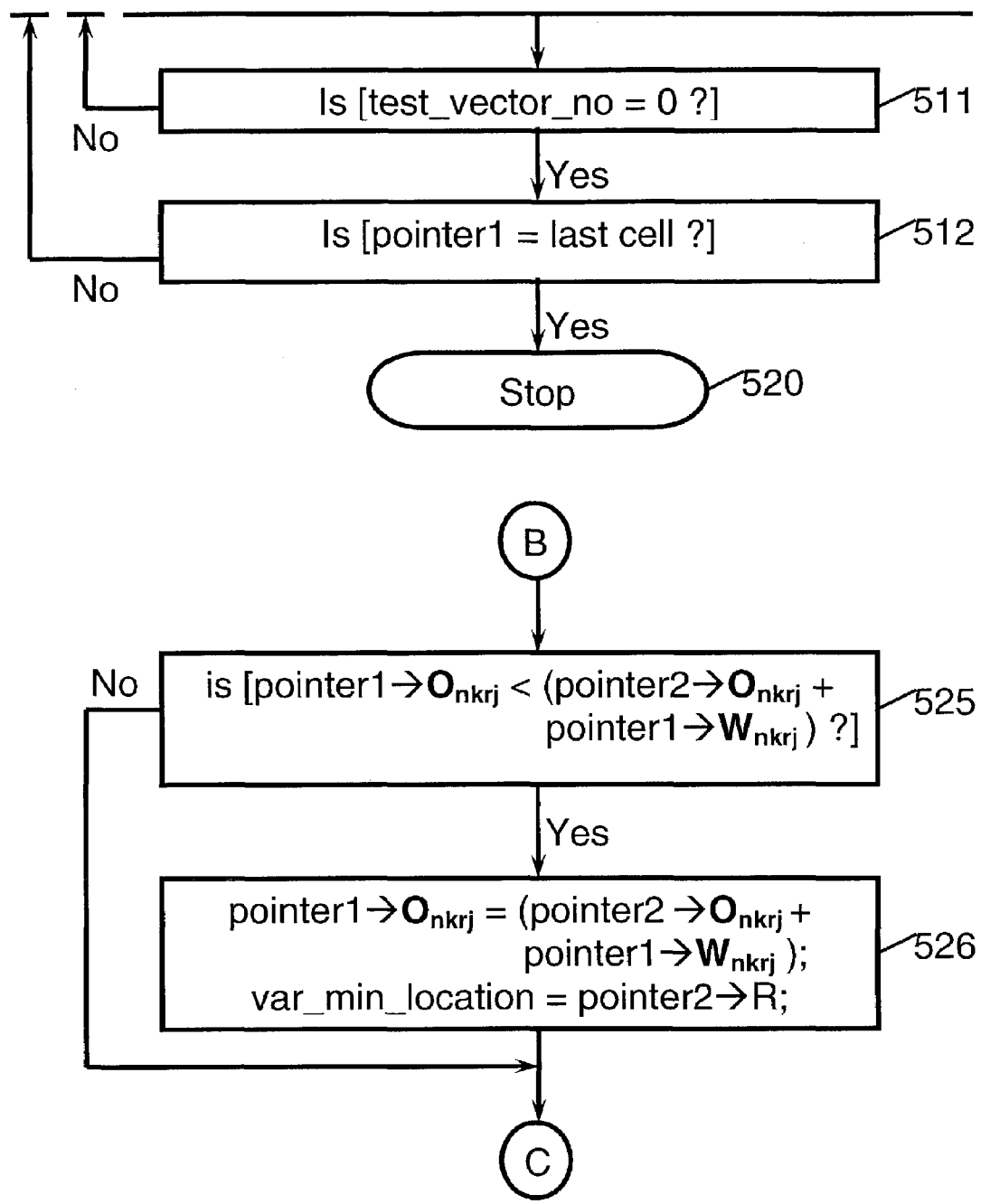

The optimization algorithm is described with the help of flow charts in FIG. 5A and FIG. 5B. The optimization principle employed here, is based on Dynamic Programming (DP). Finding the optimal matching between an input vector sequence and a model vector sequence, is formulated as finding an optimal sequence of matching vector pairs. Each vector pair is composed of an input vector that is matched to a model vector. Each pair has a pair matching score that reflects the matching quality between its vectors. The optimal sequence of vector pairs that pertain to an input vector sequence and a model vector sequence, has the highest sum of its pair matching scores compared to all other sequences of vector pairs from the same model and input sequences. The optimization algorithm gradually scans all the matching vector pairs, starting from pairs with the first input vector, and finds for each vector pair the optimal partial sequence of pairs that ends in that pair.

The principle of Dynamic Programming (DP) states that any partial sequence of matching vector pairs with an optimal score includes only sub-partial sequences that are also optimal. It means that any pair that precedes the last pair of any optimal-partial sequence of vector pairs, is also an ending of an optimal-partial sequence of vector pairs. It implies that a DP-based algorithm has to gradually build partial sequences that each ends with a terminal vector pair by searching backwards and finding the preceding pair that contributes the most to the aggregate sum of matching scores that pertains to that terminal vector pair. Thus, the DP significantly reduces the computations required, since the algorithm has to find for each pair only one preceding pair that maximizes the aggregate score. The sequencing requirement described further reduces the search space as elaborated in FIGS. 5A and 5B.

The array $A_j$, constructed as described in FIG. 4, is used in this procedure. The basic idea in the approach is to process each cell of the array $A_j$ and find the highest sum of pair-matching scores of a partial sequence that ends with matching pair $(t_{nk}, m_{rj})$, that pertains to that particular cell. A variable pointer1 holds the information of the current cell that is being processed. The pointer1 is initialized to the address of the first cell of array $A_j$ in 501 and is incremented in 502 to process subsequent cells. Pointer1 always addresses the current cell whose partial vector sequence is being optimized. The procedure is repeated until all the cells have been considered in 512. In order to find the sum of matching scores of a partial sequence that ends with matching pair $(t_{nk}, m_{rj})$, cells with input vector locations less than n and model vector location less than or equal to r have to be considered if they belong to the optimal partial sequence. During the process of consideration, cells generated due to matching vector pairs of $t_{(n-1)k}$ are considered before pairs that pertain to $t_{(n-2)k}$ and so on. This consideration process repeats itself until reaching the null vector $t_{0k}$ and this is checked by 511.

While considering vector pairs with the input vector $t_{(n-1)k}$, only vector pairs that pertain to cells with R greater than 0 as the lower bound and R less than r as the higher bound are considered. But for pairs with subsequent input vectors the range could be even narrower with the lower bound tending towards r. This saves considerable computations as the number of cells considered in finding highest sum of matching scores of the partial sequence that ends with matching pair $(t_{nk}, m_{rj})$ is reduced considerably.

Pointer2, addresses the preceding cells that are candidates to be included in the partial vector pair sequence that ends in the current cell. Pointer2 is initialized to the immediate preceding cell of current processed cell as shown in 503.

Pointer2 helps in navigating through the $A_j$ as shown in 505. In 510, Pointer2 also helps in finding whether the checking has reached the first cell. In 504, the algorithm checks for cells with required input vector location and allowable model vector locations. If the result of the checking in 504 is positive, the candidate cells are also being checked if they qualify as a preceding matching vector pair in the partial sequence. This check is performed in 525, by checking if the cell's current optimal sum of the matching scores of the partial sequence $O_{nkrj}$ is smaller than the sum of matching vector pair score of the current cell $W_{nkrj}$ with the optimal sum $O_{nkrj}$ of the cell whose address is given by pointer2. If the answer to the condition in 525 is positive, the sum of the matching score of the partial sequence, stored in $O_{nkrj}$ is incremented in 526 by adding to the matching vector pair score of the current cell $W_{nkrj}$, the value of $O_{nkrj}$ of the cell whose address is given by pointer2.

The above process is performed for each $A_j$ of array set $\{A_j\}$ this takes care of the whole collection of models $\{M_j\}$ that correspond to the set $\{A_j\}$. The cell among all the cells of $\{A_j\}$ having the highest sum of matching score $O_{nkrj}$ is selected as the highest sequence matching score and the input motion is recognized as most similar to the motion that corresponds to the winning model $M_j$.

Preferred Embodiment of the Method of Speech Recognition

Speech Recognition (SR) has been an active research objective for many years. At first, research concentrated on recognition of separate words in a limited vocabulary. More recently, research is focused on large vocabularies and continuous speech as well. Systems for speech recognition are already commercially available. However, even now those systems have high error rates and are limited to vocabularies of few thousand words in limited domains such as airline reservations.

Currently, modern speech recognition systems rely on models that require hundreds of thousands parameters that are obtained by intensive statistical analysis of hundreds of hours of recorded speech. In contrast, in our proposed method of speech recognition, we aim at reducing significantly the required number of parameters that describe speech models. Our method is elaborated in this section. But, first we have to describe the prevalent SR methods and the basic concepts related to speech.

The process of SR begins with sampling of the speech sound that is usually converted into electric signal by a microphone. This signal varies in its spectral contents relatively slowly due to physical limitations on the speed of motion of the speech articulators that generate the speech sounds, i.e. the glottis, lips and tongue. Therefore, it is possible to sample the speech signal at relatively slow frequency typically at about 100 Hz and to produce from each sample an Acoustic Feature Vector (AFV) that represents the local spectral contents of each sample. The original speech signal is now represented by a series of AFVs. Each AFV is actually a vector with approximately 40 dimensions, where each dimension represents the amplitude of one of the spectral components of the speech sampled at that point in time.

The basic SR problem is to recognize the set of utterances (spoken words) that could have generated a given sequence of AFVs. To simplify the solution of such a problem one may choose to limit the speaker's vocabulary. Reducing the size of the lexicon that lists the vocabulary, could reduce the complexity of the SR algorithm tremendously. Each utterance can be divided into phonemes, which are individual speech sounds used to pronounce each word. The phonemes could be regarded as the basic units of speech. The AFVs, which are much smaller in their time span (few milliseconds), actually are small pieces of the phonemes that generated them.

Practical lexicons typically contain tens of thousands of words. In practice, not only the words uttered by the speaker are a priori unknown, but also the number of words in each sequence. However, language constraints strongly influence the probability of various word sequences. For example, the sequence "we are a family" is much more plausible than "are family a we". In addition, more clues for word recognition are provided by the sequence of phonemes, that are in turn composed of sequences of AFVs. In summary, the complete representation of speech can be depicted as a four layer pyramid. The lower layer is composed of AFVs that are the elementary components of phonemes, the second layer is composed of phonemes that are the basic parts of words that are represented by the third layer. Evidently, the top layer represents sentences composed of sequences of words.

In order to recognize words from a sequence of AFVs, the SR system has to find the word with the highest probability that has been uttered, given a particular sequence of AFVs. Most of the SR systems rely on the maximum likelihood principle, i.e. maximizing the conditional probability P(y|w) of an AFV sequence y given a particular word w. Multiplying P(y|w) by P(w) is equal according to Bayes law to P(w|y)P(y). Assuming that P(y) is the same for all y's, maximizing P(w|y) is equivalent to maximizing P(y|w)P(w). The recognized word is the word w with the highest a-posteriori probability P(w|y), but this probability is very difficult to estimate. On the other hand, both P(y|w) and P(w) can be estimated more easily. P(w) can be derived from a model that describes the relative frequencies of the various vocabulary words based on a statistical model of the language. Determining the other term i.e. P(y|w) is much more difficult due to the stochastic and variable nature of speech, which causes the same word to be plausibly represented by a large variety of APV sequences. In addition to the natural stochastic variation and temporal variations of the sequences, there are different pronunciations of the same word with different phonemes or co-articulation that depends on neighboring words in the sentences or even on neighboring phonemes. To compensate for the temporal variations of the speech signal, the APVs used in SR may include also first and second temporal derivatives of their spectral components.

Most contemporary SR systems employ the Hidden Markov Model (HMM) to find the most probable word w given an APV sequence y, i.e. to find a w that maximizes [P(w|y)]. The HMM models the stochastic nature of speech and operates as a probabilistic finite state machine. This machine can be described as a directed graph. The graph nodes represent states and the graph's directed arcs represent feasible transitions from one state to the next. The arcs can also start and end at the same state (self loop). Thus, the topology of the graph determines which transitions are valid and which are not. If two nodes are not connected, the machine can not transit between these nodes. Also, each of the transitions may have different probabilities. So, each arc has an attached weight that signifies the probability of its transition. At each time frame the machine makes a probabilistic transition. Each transition generates one APV. To emit a full phoneme, one has to traverse the graph from the initial state to the final state. Due to the probabilistic structure of the HMM the same phoneme could have a different sequence of APVs each time. In practice, these variations actually represent different pronunciations of the same phoneme while the sequences of APVs represent their temporal-spectral contents.

If the HMM graph represents a phoneme, the different ways to pronounce it are modeled by the various ways one can traverse this graph from the first node to the last. The transition probabilities attached to the arcs govern the statistical distribution of these pronunciations. The duration of the phoneme is equal to the number of transitions (and also time frames) required to traverse the graph. The transition probabilities that govern the behavior of the HMM for each phoneme, has to be estimated from a very large set of spoken words, which are analyzed by extracting their APVs from the speech signal and then applying special maximum likelihood (ML) algorithms. Actually, the situation is even more complicated since the probabilities are modeled as probability densities and the ML estimates their parameters. For example, if the probability densities are modeled as a mixture of Gaussians, the required parameter set includes the means and the standard deviations of these Gaussians.

As already mentioned, the estimation process of the parameters of the transition probability densities is very complex. The process is called training of the particular HMM that is representing a specific utterance. Such HMM is composed of concatenated HMMs that each represents a phoneme in the utterance that may include more than one word. The estimation process necessitates the use of the Expectation Maximization (EM) algorithm. The situation is further complicated by effects such as co-articulation. In such a case, the sequence of APVs that describe a phoneme in an utterance may vary depending on the neighboring phonemes i.e. the context. This requires to find a huge amount of densities to represent all the possibilities. For example, if a language has 50 different phonemes, and one considers as context only one phoneme preceding and one trailing phoneme as a context that affects the co-articulation, the number of possible variations rises to 125,000. To manage such an enormous complexity, the densities have to be clustered and represented only by the few probability densities that are at the centers of these clusters.

After training the probabilities, given a sequence of APVs that are derived from an utterance, one has to find the sequence of words that were uttered. This is the main goal of the SR algorithm. The major use of HMMs in SR is to compute the likelihood that a given sequence of AFVs y is produced by the HMM of a particular phoneme w (or a word). To infer which phoneme generated a given AFV sequence, one has to compare the joint probabilities P(y|w) P(w) i.e. all the likelihood's that different w's generated y. The phoneme (or word) w that has the highest likelihood is the one that best matches the given AFV sequence y. The Viterbi algorithm, which is based on dynamic programming is used to find the highest likelihood for each phoneme. After finding the most probable phoneme foe each AFV sequence, it is necessary to find which word has the highest likelihood to represent the phoneme sequence found. Again, this procedure is quite lengthy since one has to compute the likelihood's of all the w HMMs in the vocabulary for a given sequence y. Such a procedure is serial because it requires to compute all the possible w HMMs in series and then to compare them. In comparison, our method is much more efficient since it is parallel, i.e. it considers and compares all the possible w's at once.

In our approach, which is called Recognition by Indexing and Sequencing (RISq), one can vote on phonemes or even directly on words. An hierarchical voting structure, where initially one uses the AFVs to vote for phonemes and then uses the identified phonemes to vote for the most probable words, is also feasible.

Assuming that our RISq voting is performed with AFVs, it is necessary to vote for each AFV only once. After the first AFV is voted, the next AFV in the sequence y is also voted (but on a smaller word/phoneme set) and so on. Each vote yields all the possible words (or phonemes) that could include the voting AFV in their signal. The first AFV votes for all the possible words (or phonemes) in the vocabulary. The second AFV votes only on words (or phonemes) that include the second AFV after the first AFV. The third AFV votes on an even more reduced set of words (or phonemes) that only include the third AFV after the second AFV, and so on. Each AFV votes on a reduced set of words/phonemes than the previous AFV. This is our sequencing approach that conserves the sequence but still allows missing AFVs (unuttered) in the sequence y, as frequently occurs in practice. This voting procedure has to be performed only once. At the end of the voting, the word/phoneme w with the highest voting score is identified as the most probable word/phoneme uttered by the sequence y.

This process is more efficient than the HMM approach. Since AFVs almost never match exactly the indexes in the table, the voting score can be adjusted in an inversely proportional relation to the multidimensional distance between the voting AFV and the several nearest indexes in the table. Such an inversely proportional relation can be defined as various functions of the distance, such as the Gaussian function of the Mahalanobis distance. These functions depend on the joint probability density of the vector components (dimensions) of the voting AFV. A multidimensional Gaussian function is the most plausible joint density for the preferred embodiment, but other functions could be used as well.

The training of our RISq actually requires only to construct the voting table. This table is arranged as a set of bins, where each bin is indexed (addressed) by another AFV and each bin contains a list of all the words/phonemes that include in their sequence y the bin's AFV. It is suggested to employ a Self Organizing Mapping (SOM) algorithm to find the best AFVs to represent the vocabulary. Even if the construction process of the voting table is quite tedious and lengthy, it has to be performed only once. Once the voting table is finished, the voting process could be quite fast.

As mentioned above, we could vote hierarchically first on phonemes from AFVs and then on words from phonemes. Such a process could significantly simplify the complexity of the voting tables relatively to tables required for direct voting for words from AFVs. We shall test both methods empirically. But, the principles of RISq method for both approaches remain the same.

What is claimed is:

1. A method of recognizing and classifying an input record of human movements as a member of a class of records of model human activity $A_j$ in a collection of classes of records of model human activities $\{A_j\}$, comprising:
   (a) predetermining and recording said collection of classes of records of model human activities $\{A_j\}$;
   (b) obtaining from each said class of records of model human activity $A_j$ at least one model sample;
   (c) representing each said model sample by a model vector $m_{rj}$;
   (d) representing each said class of records of model human activity $A_j$ by a model vectors sequence $M_j=(m_{1j} \ldots m_{rj} \ldots m_{qj})$, wherein each said model vector $m_{rj}$ in said model vectors sequence $M_j$ corresponds to said model sample and wherein the subscript q denotes the total number of model vectors in said model vectors sequence $M_j$, and wherein the subscript r denotes the location of said model vector $m_{rj}$ within said model vectors sequence $M_j$ and wherein the subscript j denotes the serial number of said model vectors sequence $M_j$ and also denotes the same serial number of the corresponding said class of records of model human activity $A_j$;

(e) representing said collection of classes of records of model human activities $\{A_j\}$ by a collection of corresponding model vectors sequences $\{M_j\}$;

(f) constructing a table with multidimensional addressing of table bins;

(g) predetermining a distance threshold value;

(h) storing each of said model vector $m_{rj}$ in a table bin whose address has a multidimensional value which has the smallest multidimensional distance to a multidimensional value of said model vector $m_{rj}$;

(i) obtaining from said input record of human movements at least one input sample;

(j) representing each of said input sample by an input vector $t_{nk}$;

(k) representing said input record of human movements by an input vectors sequence $T_k = (t_{lk} \ldots t_{nk} \ldots t_{pk})$, wherein the subscript p denotes the total number of the input vectors in said input vectors sequence $T_k$, and wherein the subscript n denotes the location of said input vector $t_{nk}$ within said input vectors sequence $T_k$, and wherein the subscript k denotes a serial number of said input vectors sequence;

(l) for each said input vector $t_{nk}$ selecting all the table bins with multidimensional address values which have multidimensional distances to the multidimensional value of said input vector $t_{nk}$, which are below said distance threshold value;

(m) for each selected said table bin, retrieving all said model vectors $m_{rj}$ that were stored in said selected said table bin;

(n) employing a matching algorithm that uses said input vectors sequence $T_k$ and the retrieved said model vectors $m_{rj}$, to produce a collection of matching scores $\{S_{kj}\}$, wherein each matching score $S_{kj}$ denotes the degree of similarity between said input vectors sequence $T_k$ and one said model vectors sequence $M_j$, which is a member of said collection of model vectors sequences $\{M_j\}$;

(o) recognizing and classifying said input record of human movements as a member of said class of records of model human activity $A_j$ which is represented by said model vectors sequence $M_j$ with the highest said matching score $S_{kj}$ in said collection of matching scores $\{S_{kj}\}$;

(p) adding information about said class of records of model human activity $A_j$ that was selected, to contents of said input record of human movements and providing a combined input record of human movements as an output record.

2. The method of claim 1, wherein said matching algorithm further comprises:

(a) for each input vector $t_{nk}$ in said input vectors sequence $T_k$ using all said retrieved said model vectors $m_{rj}$ to construct a set of vector pairs $\{(t_{nk}, m_{rj})\}$;

(b) for each vector pair $(t_{nk}, m_{rj})$ within said set of vector pairs $\{(t_{nk}, m_{rj})\}$, computing a pair matching score that is a function of the multidimensional values of the two vectors in the pair and reflects said vector pair matching quality;

(c) obtaining a set of valid pair sequences, which is constructed only from sequences of vector pairs that have mutual sequential relation, and wherein said mutual sequential relation between any two said vector pairs $\ldots (t_{nk}, m_{rj}) \ldots (t_{ck}, m_{ej}) \ldots$ included in a valid pair sequence, fulfills the following four conditions: (I) c is not equal to n; (II) if c>n then $r \leq e$; and (III) if c<n then $e \leq r$ and (IV) all said model vectors included in one said valid pair sequence are components of one said model vectors sequence $M_j$;

(d) computing for each said valid pair sequence, a sequence matching score, wherein said sequence matching score is a function of all said pair matching scores that correspond to said vector pairs that are components of said valid pair sequence;

(e) for each said model vectors sequence $M_j$, finding a set of said valid pair sequences that includes all said valid pair sequences which are constructed from model vectors included in said model vectors sequence $M_j$;

(f) for each said model vectors sequence $M_j$, finding a set of sequence matching scores, wherein each member of said set of sequence matching scores corresponds to said valid pair sequence which is a member of said set of said valid pair sequences, which are constructed from pairs of said input vectors and said model vectors included in said model vectors sequence $M_j$;

(g) for each said set of sequence matching scores that pertains to said model vectors sequence $M_j$, denoting the highest said sequence matching score as said matching score $S_{kj}$ of said model vectors sequence $M_j$;

(h) defining said collection of matching scores $\{S_{kj}\}$ as the collection of said matching scores $S_{kj}$ of all said model vectors sequences $M_j$ which are included in said collection of model vectors sequences $\{M_j\}$;

(i) providing said collection of matching scores $\{S_{kj}\}$ as the output of said matching algorithm.

3. The method of claim 2 wherein recorded data in said input records of human movements and in said records of model human activity, includes derived data from at least one trajectory of human body part.

4. The method of claim 3 wherein said derived data includes three dimensional orientations and positions and derivatives of said three dimensional orientations and positions derived from at least one said trajectory of human body part.

5. The method of claim 4 wherein for each said model vectors sequence $M_j$ in said collection of model vectors sequences $\{M_j\}$, applying the principles of dynamic programming in computing said highest said sequence matching score in said set of sequence matching scores that pertains to said model vectors sequence $M_j$.

6. The method of claim 1, wherein said matching algorithm further comprises:

(a) for each input vector $t_{nk}$ in said input vectors sequence $T_k$ using all said retrieved said model vectors $m_{rj}$ to construct a set of vector pairs $\{(t_{nk}, m_{rj})\}$;

(b) for each vector pair $(t_{nk}, m_{rj})$ within said set of vector pairs $\{(t_{nk}, m_{rj})\}$, computing a pair matching score that is a function of the multidimensional values of the two vectors in the pair and reflects said vector pair matching quality;

(c) obtaining a set of valid pair sequences, which is constructed only from sequences of vector pairs that have mutual sequential relation, and wherein said mutual sequential relation between any two said vector pairs ... $(t_{nk}, m_{rj})$ ... $(t_{ck}, m_{ej})$ included in a valid pair sequence, fulfills the following four conditions: (I) r is not equal to e, (II) if e>r, then n≦c, and (III) if e<r then c≦n, (IV) all said model vectors included in one said valid pair sequence are components of one said model vectors sequence $M_j$;

(d) computing for each said valid pair sequence, a sequence matching score, wherein said sequence matching score is a function of all said pair matching scores that correspond to said vector pairs that are components of said valid pair sequence;

(e) for each said model vectors sequence $M_j$, finding a set of said valid pair sequences that includes all said valid pair sequences which are constructed from model vectors included in said model vectors sequence $M_j$;

(f) for each said model vectors sequence $M_j$, finding a set of sequence matching scores, wherein each member of the said set of sequence matching scores corresponds to said valid pair sequence which is a member of said set of said valid pair sequences, which are constructed from pairs of said input vectors and said model vectors included in said model vectors sequence $M_j$;

(g) for each said set of sequence matching scores that pertains to said model vectors sequence $M_j$, denoting the highest said sequence matching score as said matching score $S_{kj}$ of said model vectors sequence $M_j$;

(h) defining said collection of matching scores $\{S_{kj}\}$ as the collection of said matching scores $S_{kj}$ of all said model vectors sequences $M_j$ which are included in said collection of model vectors sequences $\{M_j\}$;

(i) providing said collection of matching scores $\{S_{kj}\}$ as the output of said matching algorithm.

7. The method of claim 6 wherein recorded data in said input records of human movements and in said records of model human activity, includes derived data from at least one trajectory of human body part.

8. The method of claim 7 wherein said derived data includes three dimensional orientations and positions and derivatives of said three dimensional orientations and positions, derived from at least one said trajectory of human body part.

9. The method of claim 8 wherein for each said model vectors sequence $M_j$ in said collection of model vectors sequences $\{M_j\}$, applying the principles of dynamic programming in computing said highest said sequence matching score in said set of sequence matching scores that pertains to said model vectors sequence $M_j$.

10. A method of recognizing and classifying a record of input signals as a member of a class of records of model signals $A_j$ in a collection of classes of records of model signals $\{A_j\}$, comprising:

(a) predetermining and recording said collection of classes of records of model signals $\{A_j\}$;

(b) obtaining from each said class of records of model signals $A_j$ at least one model sample;

(c) representing each said model sample by a model vector $m_{rj}$;

(d) representing each said class of records of model signals by a model vectors sequence $M_j=(m_{ij} \ldots m_{rj} \ldots m_{qj})$, wherein each said model vector $m_{rj}$ in said model vectors sequence $M_j$ corresponds to said model sample and wherein the subscript q denotes the total number of model vectors in said model vectors sequence $M_j$, and wherein the subscript r denotes the location of said model vector $m_{rj}$ within said model vectors sequence $M_j$ and wherein the subscript j denotes the serial number of said model vectors sequence $M_j$ and also denotes the same serial number of the corresponding said class of records of model signals $A_j$;

(e) representing said collection of classes of records of model signals $\{A_j\}$ by a collection of corresponding model vectors sequences $\{M_j\}$;

(f) constructing a table with multidimensional addressing of table bins;

(g) predetermining a distance threshold value;

(h) storing each of said model vector $m_{rj}$ in a table bin whose address has a multidimensional value which has the smallest multidimensional distance to a multidimensional value of said model vector $m_{rj}$;

(i) obtaining from said record of input signals at least one input sample;

(j) representing each of said input sample by an input vector $t_{nk}$;

(k) representing said record of input signals by an input vectors sequence $T_k=(t_{lk} \ldots t_{nk} \ldots t_{pk})$, wherein the subscript p denotes the total number of the input vectors in said input vectors sequence, and wherein the subscript n denotes the location of said input vector $t_{nk}$ within said input vectors sequence $T_k$, and wherein the subscript k denotes a serial number of said input vectors sequence;

(l) for each said input vector $t_{nk}$ selecting all the table bins with multidimensional address values which have multidimensional distances to the multidimensional value of said input vector $t_{nk}$, which are below said distance threshold value;

(m) for each selected said table bin, retrieving all said model vectors $m_{rj}$ that were stored in said selected said table bin;

(n) employing a matching algorithm that uses the retrieved said model vectors $m_{rj}$ and said input vectors sequence $T_k$, to produce a collection of matching scores $\{S_{kj}\}$, wherein each matching score $S_{kj}$ denotes the degree of similarity between said input vectors sequence $T_k$ and one said model vectors sequence $M_j$, which is a member of said collection of model vectors sequences $\{M_j\}$;

(o) recognizing and classifying said record of input signals as a member of said class of records of model signals $A_j$ which is represented by said model vectors sequence $M_j$ that has the highest said matching score $S_{kj}$ in said collection of matching scores $\{S_{kj}\}$;

(p) adding information about said class of records of model signals $A_j$ that was selected, to contents of said record of input signals and providing a combined record of input signals as an output record.

11. The method of claim 10, wherein said matching algorithm further comprises:

(a) for each input vector $t_{nk}$ in said input vectors sequence $T_k$ using all said retrieved said model vectors $m_{rj}$ to construct a set of vector pairs $\{(t_{nk}, m_{rj})\}$;

(b) for each vector pair $(t_{nk}, m_{rj})$ within said set of vector pairs $\{(t_{nk}, m_{rj})\}$, computing a pair matching score that is a function of the multidimensional values of the two vectors in the pair and reflects said vector pair matching quality;

(c) obtaining a set of valid pair sequences, which is constructed only from sequences of vector pairs that have mutual sequential relation, and wherein said mutual sequential relation between any two said vector pairs ... $(t_{nk}, m_{rj})$ ... $(t_{ck}, m_{ej})$ ... included in a valid pair sequence, fulfills the following four conditions: (I)

c is not equal to n; (II) if c>n then r≦e; and (III) if c<n then e≦r and (IV) all said model vectors included in one said valid pair sequence are components of one said model vectors sequence $M_j$;

(d) computing for each said valid pair sequence, a sequence matching score, wherein said sequence matching score is a function of all said pair matching scores that correspond to said vector pairs that are components of said valid pair sequence;

(e) for each said model vectors sequence $M_j$, finding a set of said valid pair sequences that includes all the said valid pair sequences which are constructed from model vectors included in said model vectors sequence $M_j$;

(f) for each said model vectors sequence $M_j$, finding a set of sequence matching scores, wherein each member of the said set of sequence matching scores corresponds to said valid pair sequence which is a member of said set of said valid pair sequences, which are constructed from pairs of said input vectors and said model vectors included in said model vectors sequence $M_j$;

(g) for each said set of sequence matching scores that pertains to said model vectors sequence $M_j$, denoting the highest said sequence matching score as said matching score $S_{kj}$ of said model vectors sequence $M_j$;

(h) defining said collection of matching scores $\{S_{kj}\}$ as the collection of said matching scores $S_{kj}$ of all said model vectors sequences $M_j$ which are included in said collection of model vectors sequences $\{M_j\}$;

(i) providing said collection of matching scores $\{S_{kj}\}$ as the output of said matching algorithm.

12. The method of claim 11 wherein recorded data in said records of input signals and in said records of model signals, includes data derived from at least one speech signal.

13. The method of claim 12 wherein for each said model vectors sequence $M_j$ in said collection of model vectors sequences $\{M_j\}$, applying the principles of dynamic programming in computing said highest said sequence matching score $S_{kj}$ in said set of sequence matching scores that pertains to said model vectors sequence $M_j$.

14. The method of claim 11 wherein each of said signal is derived from at least one source, wherein each said source emits signals selected from the group consisting of continuous signals and discrete signals.

15. The method of claim 14 wherein for each said model vectors sequence $M_j$ in said collection of model vectors sequences $\{M_j\}$, applying the principles of dynamic programming in computing said highest said sequence matching score in said set of sequence matching scores that pertains to said model vectors sequence $M_j$.

16. The method of claim 10, wherein said matching algorithm further comprises:

(a) for each input vector $t_{nk}$ in said input vectors sequence $T_k$ using all said retrieved said model vectors $m_{rj}$ to construct a set of vector pairs $\{(t_{nk}, m_{rj})\}$;

(b) for each vector pair $(t_{nk}, m_{rj})$ within said set of vector pairs $\{(t_{nk}, m_{rj})\}$, computing a pair matching score that is a function of the multidimensional values of the two vectors in the pair and reflects said vector pair matching quality;

(c) obtaining a set of valid pair sequences, which is constructed only from sequences of vector pairs that have mutual sequential relation, and wherein said mutual sequential relation between any two said vector pairs ... $(t_{nk}, m_{rj})$ ... $(t_{ck}, m_{ej})$ ... included in a valid pair sequence, fulfills the following four conditions: (I) r is not equal to e, (II) if e>r, then n≦c, and (III) if e<r then c≦n (IV) all said model vectors included in one said valid pair sequence are components of one said model vectors sequence $M_j$;

(d) computing for each said valid pair sequence, a sequence matching score, wherein said sequence matching score is a function of all said pair matching scores that correspond to said vector pairs that are components of said valid pair sequence;

(e) for each said model vectors sequence $M_j$, finding a set of said valid pair sequences that includes all the said valid pair sequences which are constructed from model vectors included in said model vectors sequence $M_j$;

(f) for each said model vectors sequence $M_j$, finding a set of sequence matching scores, wherein each member of the said set of sequence matching scores corresponds to said valid pair sequence which is a member of said set of said valid pair sequences, which are constructed from pairs of said input vectors and said model vectors included in said model vectors sequence $M_j$;

(g) for each said set of sequence matching scores that pertains to said model vectors sequence $M_j$, denoting the highest said sequence matching score as said matching score $S_{kj}$ of said model vectors sequence $M_j$;

(h) defining said collection of matching scores $\{S_{kj}\}$ as the collection of said matching scores $S_{kj}$ of all said model vectors sequences $M_j$ which are included in said collection of model vectors sequences $\{M_j\}$;

(i) providing said collection of matching scores $\{S_{kj}\}$ as the output of said matching algorithm.

17. The method of claim 16 wherein recorded data in said record of input signals and in said records of model signals, includes data derived from at least one speech signal.

18. The method of claim 17 wherein for each said model vectors sequence $M_j$ in said collection of model vectors sequences $\{M_j\}$, applying the principles of dynamic programming in computing said highest said sequence matching score in said set of sequence matching scores that pertains to said model vectors sequence $M_j$.

19. The method of claim 16 wherein each of said signal is derived from at least one source, wherein each said source emits signals selected from the group consisting of continuous signals and discrete signals.

20. The method of claim 19 wherein for each said model vectors sequence $M_j$ in said collection of model vectors sequences $\{M_j\}$, applying the principles of dynamic programming in computing said highest said sequence matching score in said set of sequence matching scores that pertains to said model vectors sequence $M_j$.

* * * * *